United States Patent
Janiszewski et al.

(10) Patent No.: US 6,981,929 B2
(45) Date of Patent: Jan. 3, 2006

(54) VEHICLE DIFFERENTIAL

(75) Inventors: Grzegorz Janiszewski, Angered (SE); Jan Christian Holmström, Västra Frölunda (SE)

(73) Assignee: AB Volvo, Gothenburg (SE)

( * ) Notice: Subject to any disclaimer, the term of this patent is extended or adjusted under 35 U.S.C. 154(b) by 518 days.

(21) Appl. No.: 09/681,515

(22) Filed: Apr. 19, 2001

(65) Prior Publication Data

US 2001/0053729 A1 Dec. 20, 2001

Related U.S. Application Data

(63) Continuation of application No. PCT/SE99/01908, filed on Oct. 22, 1999.

(51) Int. Cl.
*F16H 48/06* (2006.01)
*F16H 57/02* (2006.01)

(52) U.S. Cl. .................................. 475/230; 74/606 R
(58) Field of Classification Search ............... 475/230, 475/231, 242; 74/606 R, 607
See application file for complete search history.

(56) References Cited

U.S. PATENT DOCUMENTS

| | | | |
|---|---|---|---|
| 741,931 A * | 10/1903 | Sandell | 475/230 |
| 805,740 A * | 11/1905 | Lowe | 475/230 |
| 1,422,512 A | 7/1922 | White, Jr. | |
| 1,445,865 A * | 2/1923 | Alden | 475/230 |
| 1,461,102 A | 7/1923 | Sternbergh | |
| 2,120,594 A * | 6/1938 | Alden | 475/230 X |
| 3,362,258 A * | 1/1968 | Thornton | 475/230 |
| 4,402,238 A * | 9/1983 | Craig | 475/230 |
| 4,671,136 A * | 6/1987 | Katayama | 475/230 X |
| 4,959,043 A * | 9/1990 | Klotz et al. | 475/230 |
| 5,584,777 A * | 12/1996 | Sander et al. | 475/230 |
| 5,897,453 A * | 4/1999 | Mimura | 475/230 X |
| 6,056,663 A * | 5/2000 | Fett | 475/231 |
| 6,176,152 B1 * | 1/2001 | Victoria et al. | 74/607 |

FOREIGN PATENT DOCUMENTS

| | | |
|---|---|---|
| DE | 4042173 A1 | 7/1992 |
| GB | 1371060 A | 10/1974 |

* cited by examiner

*Primary Examiner*—Roger Pang
(74) *Attorney, Agent, or Firm*—Fitch, Even, Tabin & Flannery

(57) ABSTRACT

Vehicle differential with a differential housing (5) consisting of two pressed sheet metal halves (6). Each sheet metal half is made with radial, gutter-shaped depressions, which are limited at their outer ends by wall portions (14). A differential pinion shaft (15) is received in the depressions between the sheet metal halves. The wall portions (14) limit the axial movement of the differential pinion shaft.

20 Claims, 3 Drawing Sheets

VEHICLE DIFFERENTIAL

CROSS REFERENCE TO RELATED APPLICATIONS

This is a continuation patent application of International Application Number PCT/SE99/01908 filed 22 Oct. 1999 which designates the United States; the disclosure of that application is expressly incorporated by reference in its entirety.

BACKGROUND OF INVENTION

By far the most common construction of a vehicle differential has a differential housing cast in one piece, and which has on its outside a mounting flange to which the differential crown wheel is securely screwed. The housing is made with assembly openings, through which the differential side gears and pinions can be inserted, and secondly, with opposing openings, through which the differential pinion shaft can be inserted and fixed. The housings of such differentials, however, are heavy and expensive to manufacture. Assembly is also relatively complicated.

It is previously known, for example in DE-OS-40 42 173, to make a differential housing of two pressed and joined sheet metal halves. The depressions in the differential housing halves have the shape of radially outwardly and inwardly open gutters that are slotted and have a radius somewhat less than the radius of the end portions of the differential pinion shaft. This provides a certain amount of flexibility and pretensioning against the end portions of the shaft when the housing halves are joined together. Final fixation of the differential pinion shaft in the housing is effected by welding at the same time as the crown wheel is welded to the housing. A differential with a differential housing produced in this manner is more simple to manufacture and assemble than a conventional differential with a cast differential housing, and is much lighter.

SUMMARY OF INVENTION

The purpose of the present invention is to further improve and simplify differential designs having a differential housing consisting of pressed sheet metal halves.

According to the present invention, this goal is achieved at least partially due to the fact that the depressions are radially outwardly closed gutters with wall portions extending over the end surfaces of the end journals, limiting the axial movement of the end journals.

In known designs, the housing halves have been required to be held tightly against each other and against the differential pinion shaft until welding is complete. The welding process, however, runs the risk of becoming skewed due to heat deformation and misalignment of the differential pinion shaft, which is completely and solidly joined to the differential housing, and consequently cannot move to compensate for uneven gear engagement due to shaft misalignment.

In the present design, the shaft need only be laid in the depressions and after which the housing halves are joined together, preferably by riveting or screwing. The fit between the shaft and the depressions is not critical. The shaft can be allowed to move somewhat axially and radially to compensate for tolerances in the gear engagement. No clamping or welding occurs, which makes the assembly more simple and less expensive.

BRIEF DESCRIPTION OF DRAWINGS

The invention will be described in more detail below with reference to examples shown in the accompanying drawings, where.

DETAILED DESCRIPTION

Figure 1:
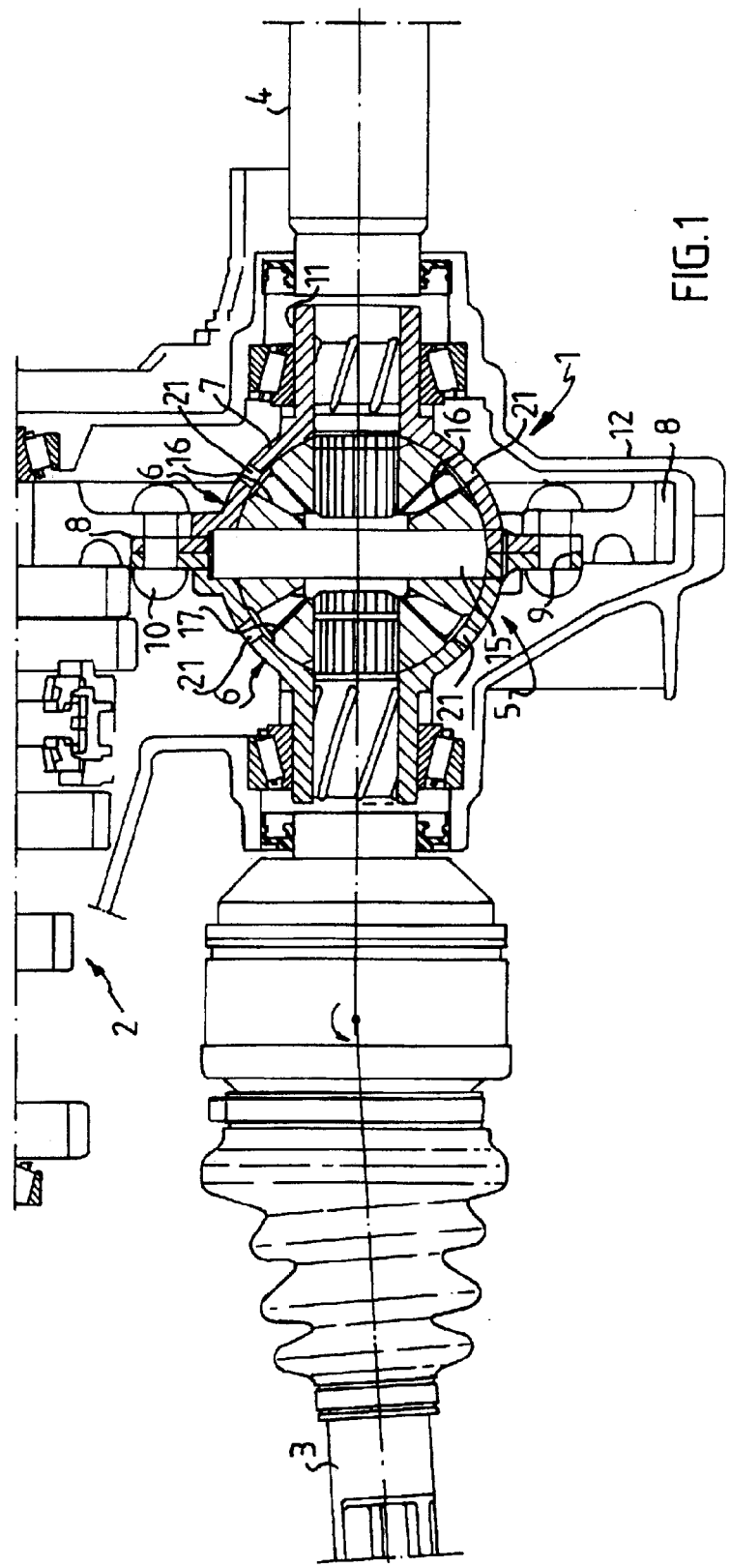
FIG. 1 shows a partial cross sectional view through one embodiment of a vehicle differential configured according to the present invention.

Referring to the Figs., a final drive 1 is designated between a gearbox 2 and a pair of drive wheel axles 3 and 4 of a front wheel drive vehicle having a transverse engine. The final drive 1 has a differential housing 5 having two identical halves 6 of pressed sheet metal. The respective housing halves 6 consist of a semi-spherical portion 7, a flange portion 8 with holes 9 for fasteners, which in the example shown in FIG. 1 are rivets 10, and a tube stub 11 for external bearing of the differential housing 5 in the final drive housing 12, and internal bearing of the wheel shafts 3, 4.

Each housing half 6 is made with a pair of semicylindrical gutter-shaped depressions 13, which are closed at their outer ends by semi-circular wall portions 14. The depressions 13 form the seats for a differential pinion shaft 15 on which there are journalled differential pinions 16 engaging differential side gears 17 joined to their respective axles 3, 4. Before the housing halves 6 are riveted together with the crown wheel 18, one of the differential side gears 17 is placed in one housing half 6, and the differential pinion shaft 15 is then placed in the depressions 13 in the housing half with its differential pinions 16 in engagement with this differential side gear 17. The other differential side gear 17 is then brought into engagement with the differential pinions 16, and the housing halves 6 are joined together so that the rivet holes 10 coincide. Finally, the crown wheel 18 of the differential is placed against the flange 8 with its rivet holes coinciding with the rivet holes 10. The corners 19 of the heels 20, formed on the opposite side from the depressions 13 when they are pressed, serve as centering surfaces for centering the crown wheel 18 for riveting.

No welding is required since the wall portions 14 of the depressions 13 form end abutments limiting the axial movement of the shaft 15. The depressions and the shaft can be so dimensioned relative to each other that the shaft 15 is clamped non-rotatably between the housing parts and so that the wall portions 14 abut against the shaft ends, so that the shaft 15 is also fixed axially. Alternatively, the parts, if so desired, can be dimensioned so that there is a small play between the shaft ends and the wall portions 14, and with a slide fit between the lateral surface of the shaft and the depressions, so that the shaft can move somewhat to compensate for tolerances. In order to ensure the supply of lubricant to the gears, the differential housing is provided with openings 21 close to the areas of gear engagement.

Figure 2:
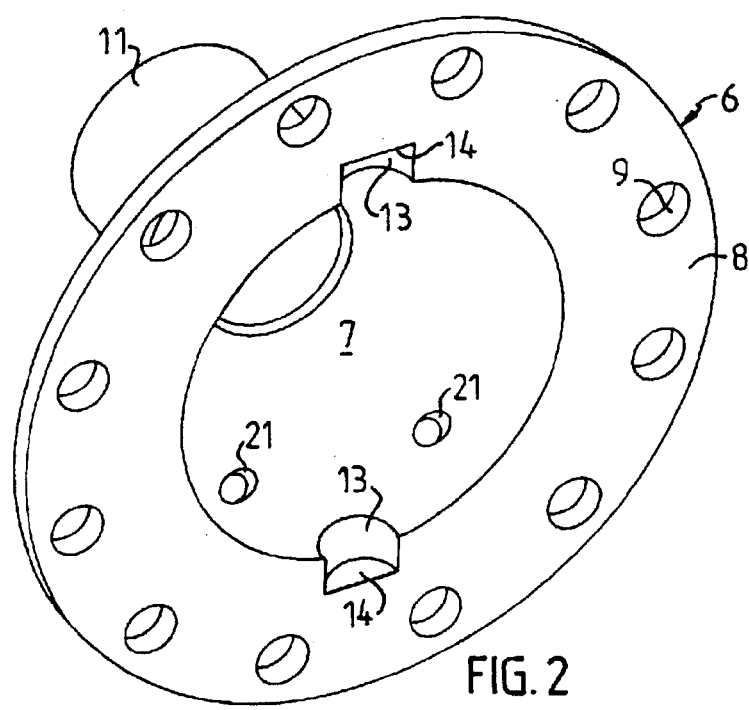
FIG. 2 shows a perspective view of a differential housing half of the differential housing in FIG. 1.
Figures 3, 4:
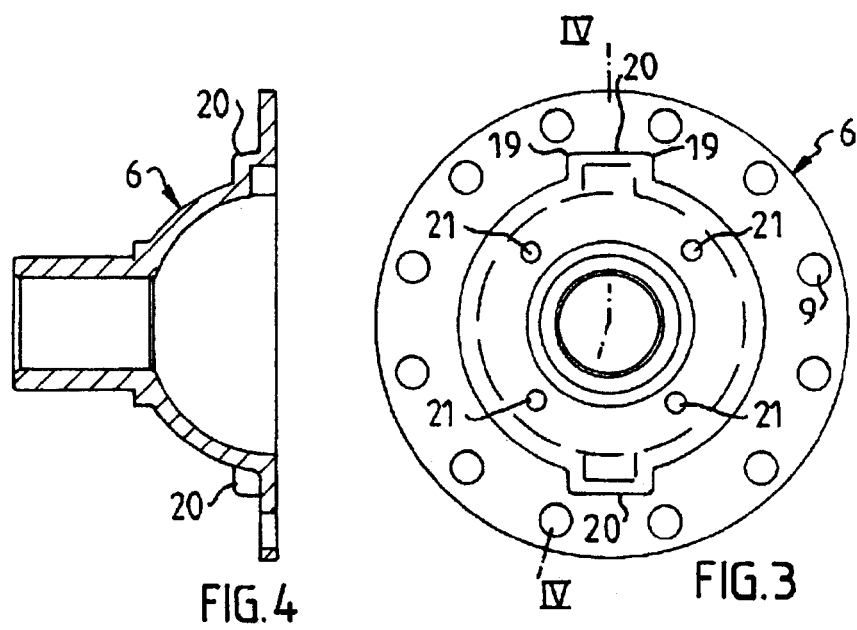
FIG. 3 shows an end view from the outside of the differential housing.
FIG. 4 shows a cross sectional view taken along the line IV—IV indicated in FIG. 3.
Figures 5, 6:
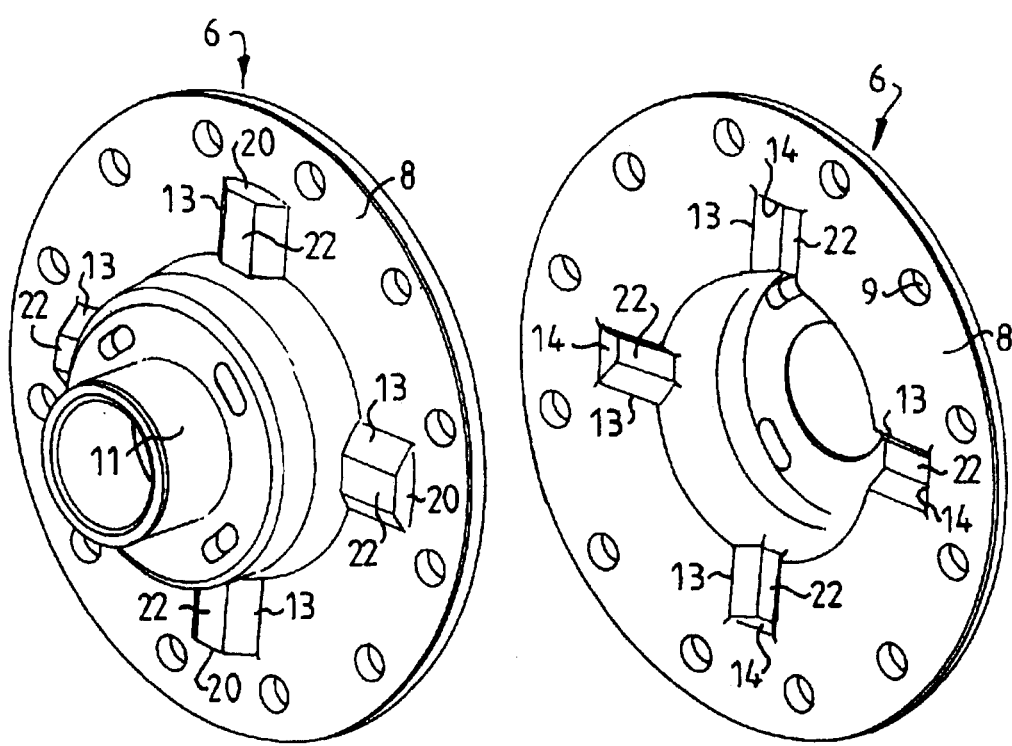
FIGS. 5 and 6 show perspective views from two opposite sides of a second embodiment of a differential constructed according to the present invention.

FIGS. 5 and 6 show an embodiment in which each housing half 6 is made with two pairs of gutter-shaped depressions 13 intended to receive a spider (not shown) instead of a single shaft 15. The spider carries four differential pinions instead of the two differential pinions 16 on the differential pinion shaft 15. As can be seen in FIGS. 5 and 6, the gutter-shaped depressions are not entirely circular semi-cylindricals rather they have flat portions 22 to assure that the spider is securely clamped. The gutter-shaped depressions 13 in the embodiment shown in FIGS. 2–4 can, if so desired, be made with corresponding flattened portions, and the ends of the differential pinion shaft 15 can be made with corresponding cross sectional profiles.

The embodiment with a differential housing 5 consisting of two pressed sheet metal parts 6 makes variable placement of the shafts possible without difficulty. Thus, it is not necessary to keep to the traditional design with a differential pinion carrier in the form of a shaft or a spider with two perpendicular crossing shafts. Rather, if so desired, it is also possible to have a differential pinion carrier with three separate shaft ends spaced at 120° from each other.

What is claimed is:

1. A vehicle differential comprising:
   a differential housing having two pressed sheet metal halves joined together, and
   a differential pinion carrier having end journals received in corresponding, radially directed depressions in the sheet metal halves,
   wherein the depressions are gutter-shaped and closed at their outer ends with wall portions extending over the end surfaces of the end journals, thereby limiting the axial movement of the end journals.

2. The vehicle differential according to claim 1, wherein the sheet metal halves have the same shape.

3. The vehicle differential according to claim 1, wherein the depressions and the end journals are so dimensioned relative to each other that there is a small play between said end surfaces and the opposite surfaces on the said wall portions.

4. The vehicle differential according to claim 3, wherein the end journals of the differential pinion carrier are received with slide fit in the depressions.

5. The vehicle differential according to claim 1, wherein the end journals of the differential pinion carrier are clamped securely in the depressions.

6. The vehicle differential according to claim 5, wherein the depressions have a cross section deviating from a semi-circle.

7. The vehicle differential according to claim 1, wherein the depressions form heels on their opposite sides, said heels having surface portions in contact with a crown wheel fixed to the outside of the differential housing, for centering the crown wheel when mounting it on the differential housing.

8. The vehicle differential according to claim 1, wherein the differential housing is made with at least one channel for providing lubricant access from a surrounding final drive housing into the differential housing.

9. The vehicle differential according to claim 8, wherein a lubricant channel is disposed within each gear engagement area between inter-engaging gears in the differential housing.

10. An arrangement for a vehicle differential, said arrangement comprising:
    a differential housing having two joinable sheet metal halves, at least one of said sheet metal halves having a depression formed therein, said depression configured to accommodate reception of an end journal of a differential pinion carrier therein; and
    said depression being of a gutter-type configuration and closed at an outer end thereof by a wall portion, said wall portion being configured to extend over an end surface of an end journal of a differential pinion carrier and being adapted to limit axial movement of the end journals.

11. The arrangement for a vehicle differential according to claim 10, said arrangement further comprising:
    each of said sheet metal halves having two depressions formed therein and each of said two depression being radially oriented and oppositely positioned, one to the other.

12. The arrangement for a vehicle differential according to claim 11, said arrangement further comprising:
    a differential pinion carrier having end journals at each of two ends thereof and each of said end journals being positioned in respective radially oriented and oppositely positioned depressions.

13. The arrangement for a vehicle differential according to claim 12, said arrangement further comprising:
    said differential housing having at least one channel configured to provide lubricant access from a surrounding final drive housing into the differential housing.

14. The arrangement for a vehicle differential according to claim 12, said arrangement further comprising:
    each depression and the respective end journal positioned therein being configured so that only a small amount of play is permitted between a distal end surface of said end journal and an exposed surface of a wall portion positioned adjacently thereto.

15. The arrangement for a vehicle differential according to claim 12, said arrangement further comprising:
    each of said end journals of said differential pinion carrier being translationally received in a depression for reciprocating movement within said depressions.

16. The arrangement for a vehicle differential according to claim 12, said arrangement further comprising:
    each end journals of said differential pinion carrier is securely clamped in a respective depression.

17. The arrangement for a vehicle differential according to claim 16, said arrangement further comprising:
    each of said depressions having a cross section deviating from a semi-circular shape.

18. The arrangement for a vehicle differential according to claim 17, said arrangement further comprising:
    each of said depressions forming a heel on an exterior side thereof, each of said heels having a surface portion in contact with a crown wheel fixed to an outside of the differential housing for centering said crown wheel when being fixed on said differential housing.

19. The arrangement for a vehicle differential according to claim 12, said arrangement further comprising:
    said differential housing having at least one channel therethrough for providing lubricant access from a surrounding final drive housing into said differential housing.

20. The arrangement for a vehicle differential according to claim 19, said arrangement further comprising:
    said lubricant channel being disposed within a gear engagement area between inter-engaging gears in said differential housing.

* * * * *